J. H. GLAUBER, DEC'D.
THE CITIZENS SAVINGS & TRUST COMPANY, EXECUTOR.
LAVATORY FITTING.
APPLICATION FILED OCT. 28, 1914.
1,224,297.
Patented May 1, 1917.
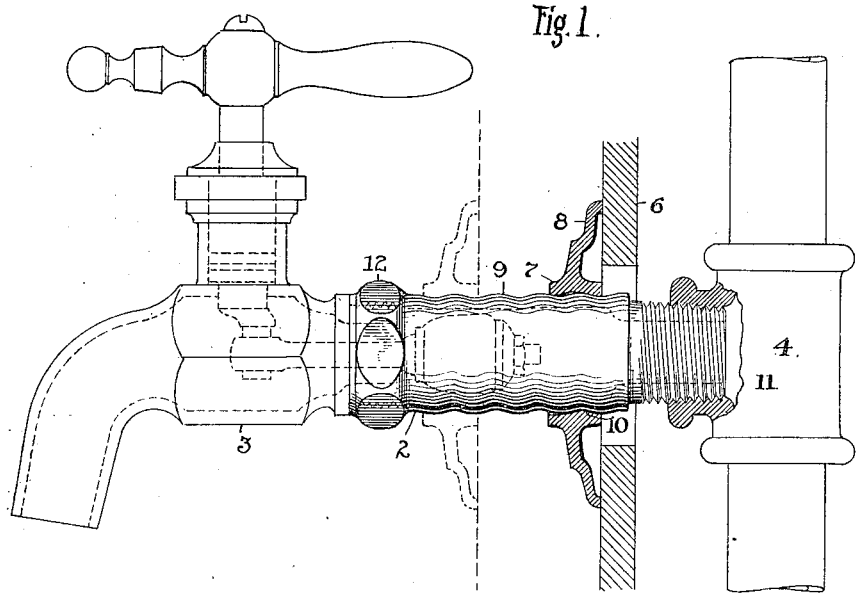
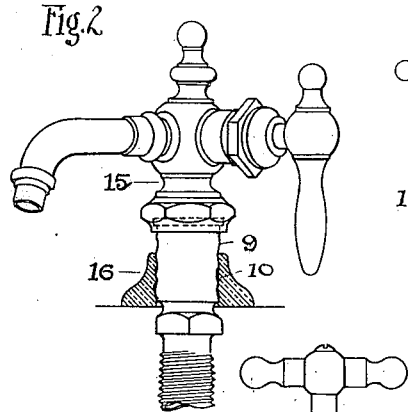
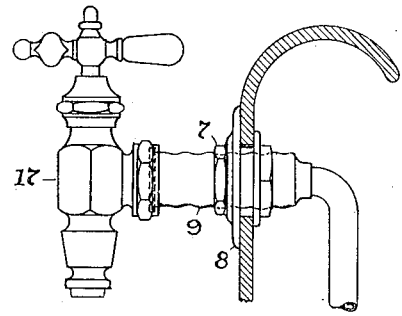
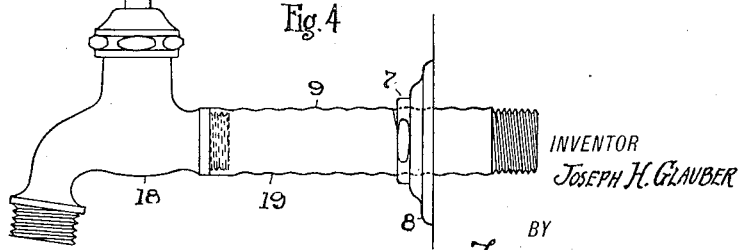
WITNESSES:
H. F. Brown.
M. Schwan.
INVENTOR
JOSEPH H. GLAUBER
BY
Fisher &
ATTORNEY

UNITED STATES PATENT OFFICE.

JOSEPH H. GLAUBER, OF CLEVELAND, OHIO; THE CITIZENS SAVINGS & TRUST COMPANY, EXECUTOR OF ESTATE OF JOSEPH H. GLAUBER, DECEASED.

LAVATORY-FITTING.

1,224,297.  Specification of Letters Patent.  Patented May 1, 1917.

Application filed October 28, 1914. Serial No. 868,947.

*To all whom it may concern:*

Be it known that I, JOSEPH H. GLAUBER, a citizen of the United States, residing at Cleveland, in the county of Cuyahoga and State of Ohio, have invented certain new and useful Improvements in Lavatory-Fittings, of which the following is a specification.

This invention relates to improvements in lavatory fittings, and the improvement resides more particularly in a shank or coupling tube and a flanged screw sleeve or collar adapted to give a sightly and sanitary adjustable connection for a lavatory appliance substantially as herein shown and more particularly pointed out in the claim.

In the accompanying drawings, Figure 1 is a side view of a faucet of the Fuller type and a side elevation and sectional view of my improved adjustable connection therefor. The full and dotted lines representing the screw collar and flange show the long range of adjustment afforded by the improvement when embodied in a relatively short shank. Figs. 2, 3 and 4 illustrate the improvement embodied in a basin cock, bath cock and a compression cock respectively.

For the purpose of illustrating the utility of the invention I have shown my improvement as applied to the shank 2 of a faucet or cock 3. The shank 3 is attached to a standard pipe fitting 4 and clamped upon a wall, or the back 6 of a tub or sink, by means of a screw collar 7 having an annular flange 8. Heretofore, such shanks have been provided with standard V threads over a portion of their length externally to afford a longitudinal adjustment of the screw collar and flange thereon relatively to the wall or back. Consequently, when the faucet or cock is connected to the service pipe as described, more or less of the threaded portion of the shank is visibly exposed in front of the wall or back, and in the case of V threads, the relatively deep sharp grooves between the screw threads accumulate dirt, soap and grease which makes the exposed threaded portion of the shank unsightly and insanitary. To obviate such objectionable conditions and at the same time provide an adjustment of the screw collar and flange the full length of the shank or to any exposed point thereon, I have provided the external surface of the cylindrical shank 2 with a quick screw thread 9 and have formed the screw collar 7 internally with a corresponding female thread 10 from end to end thereof. The pitch of the thread, that is, the distance from center to center of two adjacent threads, is relatively wide or broad,—a desirable width being approximately five-sixteenths of an inch, more or less, and the lead of the thread is therefore equal to this pitch when only a single screw thread is used. The top and bottom portions of the thread are rounded and the angles of the sides are extremely obtuse to form a thread of shallow depth. The radii for the rounded portions of the thread, top and bottom, are relatively long and preferably, but not necessarily the same. An effective thread, both from an ornamental and a working standpoint, is obtained by having the radii for the rounded portions equal and relatively long and the sides of the thread merged to produce an extended compound curve of shallow depth. The concept is to provide a thread of relatively small depth and rounded on the top on a radius materially and prominently greater than the depth of said thread. A thread of this kind does not weaken the shank, it is ornamental and attractive; it affords a smooth surface capable of taking and retaining a highly polished finish; it is easy to polish and clean; it will not hold dirt or lint; and it permits quick and convenient adjustment of the screw collar. Furthermore, a thread of this kind can not strip; it permits a porcelain or glass screw collar and flange to be adjustably used on the shank; it may extend over a portion or the entire length of the shank; and a relatively short collar can be employed whereby maximum adjustment of the screw collar with a minimum length of shank is made feasible and practical.

The shank 2 shown has a reduced and externally threaded end 11 which is adapted to screw into a T or other fitting 4, and this end may be supplied with an internal thread or a slip joint or any other connection may be employed instead. The opposite end of the shank is shown as provided with an annular enlargement 12 having wrench-engaging facets, but this end may be plain. The shank shown is also a separate piece secured in screw engagement with faucet 3 but it might be an integral part thereof as in compression cocks and bibs now in common use. When made separate, the shank is capable of use with basin bibs, bath cocks, etc., and becomes a separate article of manufacture and sale. In fact, the improvement is applicable to any lavatory appliance or connection requiring an adjustable collar and flange, especially where a threaded shank or tubular portion is exposed and particularly where a long thread is required for a collar or lock nut or both.

A shank as described, if installed without the screw collar and flange is not objectionable as the quick round thread is distinctly ornamental. It is also evident by reference to Fig. 4 that the shank may be of considerable length to give a long range of adjustability for the screw collar where the ordinary threaded shank would be unsuitable and objectionable. Certain advantages are also obtained in the making of the shank according to my invention as the round quick thread can be cast, or the shank and flange may be made of drawn metal and the thread formed in any good mechanical way.

The screw collar may be plain or provided with wrench engaging faces, and the internal or female thread of the collar is made slightly larger than the external or male thread 2 on the shank so that a limited amount of loose play is provided between the parts, whereby quick and easy rotation of the collar may be had on the shank in making adjustments without marring the finished and nickel-plated surface. Furthermore, this loose play affords a slight longitudinal movement of the collar on the shank which assures a secure locking effect of the collar when the flange is engaged with the wall or back 6. Locking is due to a wedging action produced by and between the obtuse or slightly inclined sides of the screw threads 9 and 10, the shallow thread making such locking effective notwithstanding the quick lead of said thread, and clamping and locking of the screw collar and flange is a last step in making a connection due to the difference in pitch and lead of the quick thread 2 compared to the V thread on end 11 of the shank.

In Fig. 2, I show a basin cock or bib 15 embodying my improvement, and having a porcelain screw collar 16 forming the base part of the cock. In Fig. 3, the improvement is shown as applied to the coupling pipe of a bath cock 17, and in Fig. 4 to a compression cock 18 with an extension shank 19. Other applications of the invention are made obvious in view of the foregoing, and the claim is to be construed accordingly.

What I claim is:

The combination of a wall or back and a pipe fitting, with a shank having a threaded end engaged with said fitting and a flanged screw collar engaged with said wall, or back, said shank and collar having complementary screw threads of relatively small depth and rounded at the top on a radius prominently greater than the depth of said thread and the screw threads on the collar being larger and having loose longitudinal play relatively to the screw threads on the shank to afford quick and easy rotation and prevent marring of the shank surface in adjustments and to provide a wedging effect between the parts in clamping operations.

In testimony whereof I affix my signature in presence of two witnesses.

JOSEPH H. GLAUBER.

Witnesses:
R. B. MOSER,
M. SCHWAN.

Copies of this patent may be obtained for five cents each, by addressing the "Commissioner of Patents, Washington, D. C."